May 29, 1956
D. P. BOLAND
2,747,320
FISH LINE LEADER
Filed May 7, 1954
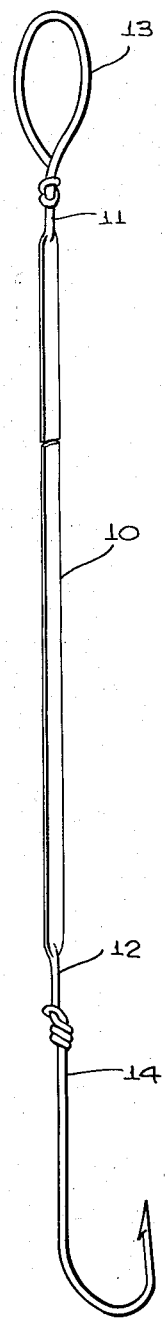
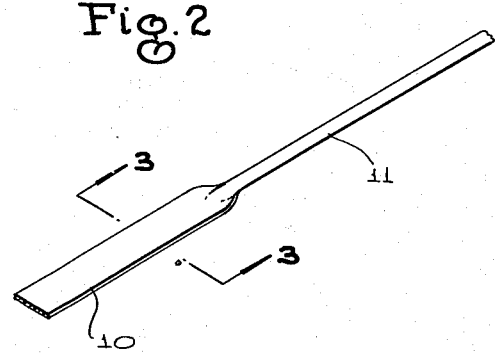
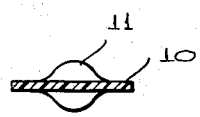
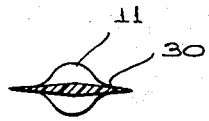
INVENTOR.
DANIEL P. BOLAND
BY
McMorrow, Berman & Davidson
ATTORNEYS United States Patent Office 2,747,320
Patented May 29, 1956

2,747,320

FISH LINE LEADER

Daniel P. Boland, Deer Creek, Ill.

Application May 7, 1954, Serial No. 428,229

5 Claims. (Cl. 43—44.98)

The present invention relates to a new and improved type of leader for use to connect a fishhook to a fish line, and has for its principal object to provide a leader which is relatively invisible to the fish while maintaining a strength comparable to other and larger leaders.

Leaders now in use include those made from gut, stranded metal, synthetic fibers, spun glass and other strand materials. Generally, the leader is constructed of the smallest dimensions in cross section possible in order that it be inconspicuous in the water and yet of sufficient strength as to resist breaking. It must also be relatively flexible so that it permits movement of a lure or bait, and should have ends that are readily connected by tying to the hook at one end and to the fish line at the other.

Another object of the present invention is to provide a leader having a midportion which is of particular structure so as to render it less visible to the fish and having end portions which are readily tied to the hook and the line.

A further object of the invention is to provide a leader which is more flexible in one direction than in another and therefore suited for conditions of trolling or casting in which a lure or bait is wanted to bob or wiggle in one plane of motion only.

These and other objects and advantages of the present invention will be fully apparent upon consideration of the following description when taken in connection with the annexed drawing, in which like numerals indicate like parts throughout the several views, and in which:

Figure 1 is a plan view in elevation of the present invention;

Figure 2 is a view in perspective of a portion of the invention;

Figure 3 is a view in section taken on line 3—3 of Figure 2;

Figure 4 is a view in section of a second embodiment of the present invention; and Figure 5 is a view in section of a third embodiment of the invention.

Referring more particularly to the drawings, in Figures 1 to 3, it will be seen that the invention consists of an elongated strip of plastic or other flexible material having a midportion 10 and end portions 11 and 12. The embodiment shown in Figures 1 to 3 shows a midportion 10 of rectangular cross section terminating at each end in an end portion having a circular cross section. As the invention is preferably molded from a single strand or strip it is understood that the cross sectional areas of the ends are equal to the cross sectional areas of the midportion, thusly providing a leader of constant strength throughout its length. One end portion 11 is looped at 13 to provide a convenient hitch for a fish line, and the other end portion 12 is knotted around the shank and eye of the hook 14.

In the embodiment shown in Figure 4 the midportion 20 is oval in cross section while the ends are the same as in the first embodiment of Figures 1 to 3.

Figure 5 illustrates another embodiment of the invention, in which the midportion 30 is diamond-shaped, tapering from the midline or longitudinal axis of the strip to its edges.

In each of the embodiments, it will be seen that the width of the midportion is of much greater width than the thickness, and is practically invisible when looking broadside through its flat midsection which may be as thin as a strip of cellophane. It will be seen also that the midportion of each of the embodiments shown is flexible in one direction only and resists flexing in the plane of its width.

While a single oval shape has been illustrated and a single illustration given of a diamond-shaped midportion, it is to be understood that all ovals and all diamond-shaped midportions of many widths and thickness are contemplated. Other shapes are also contemplated with the width of the midportion greater than its thickness, the midportion may be grooved for its length on one or both sides, as an example.

Other changes and modifications of the present invention are contemplated without departing from the spirit and scope of the invention as set forth in the appended claims.

What is claimed is:

1. A leader for a fish line comprising an elongated strip having a midportion and two end portions, said midportion being of greater width than thickness, each of said end portions being substantially circular in cross section and adapted to be connected one each to a hook and a fishing line, said end portions each having a cross sectional area equal to the cross sectional area of said midportion.

2. A leader for a fish line comprising an elongated flexible strip having a midportion and two end portions, said midportion being of greater width than thickness and being rectangular in cross section, each of said end portions being substantially circular in cross section and adapted and arranged to be connected one each to a hook and a line, said end portions each having a cross sectional area equal to the cross sectional area of said midportion.

3. A leader for a fish line comprising an elongated flexible strip having a midportion and two end portions, said midportion being of greater width than thickness and being oval in cross section, each of said end portions being substantially circular in cross section and adapted and arranged to be connected one each to a hook and a line, said end portions each having a cross sectional area equal to the cross sectional area of said midportion.

4. A leader for a fish line comprising an elongated flexible strip having a midportion and two end portions, said midportion being of greater width than thickness and being tapered in cross section from its longitudinal axis to its edges, each of said end portions being substantially circular in cross section and adapted and arranged to be connected one each to a hook and a line, said end portions each having a cross sectional area equal to the cross sectional area of said midportion.

5. A leader for a fishing line comprising an elongated strip having a midportion and two end portions, said midportion being of greater width than thickness, each of said end portions being of circular cross section and the midportion lying in a plane disposed diametrically of the respective end portions, one of said end portions being doubled upon itself to form a line-attaching loop and the other end portion being adapted to be spirally twisted for winding of the same about the shank of a fish hook, said end portions each being of a cross sectional area equal to the cross sectional area of said midportion.

References Cited in the file of this patent

UNITED STATES PATENTS

| | | |
|---|---|---|
| 1,350,907 | Yanani | Aug. 24, 1920 |
| 1,902,953 | Hazell | Mar. 28, 1933 |
| 2,231,616 | Constantino | Feb. 11, 1941 |
| 2,264,415 | Taylor et al. | Dec. 2, 1941 |
| 2,267,285 | McCrave | Dec. 23, 1941 |
| 2,291,873 | Brubaker | Aug. 4, 1942 |
| 2,559,080 | MacAllister | July 3, 1951 |